United States Patent
Kajima et al.

(10) Patent No.: US 8,560,152 B2
(45) Date of Patent: Oct. 15, 2013

(54) INVERTED TYPE MOVING BODY AND METHOD OF CONTROLLING SAME

(75) Inventors: Hideki Kajima, Toyota (JP); Yoshiyuki Semba, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 1094 days.

(21) Appl. No.: 12/440,980

(22) PCT Filed: Sep. 17, 2008

(86) PCT No.: PCT/JP2008/066712
§ 371 (c)(1),
(2), (4) Date: Mar. 12, 2009

(87) PCT Pub. No.: WO2009/054207
PCT Pub. Date: Apr. 30, 2009

(65) Prior Publication Data
US 2010/0179749 A1   Jul. 15, 2010

(30) Foreign Application Priority Data
Oct. 23, 2007   (JP) .................................. 2007-274769

(51) Int. Cl.
*G06F 17/00* (2006.01)
*G06F 19/00* (2011.01)
*B60T 8/32* (2006.01)
*B60T 8/24* (2006.01)

(52) U.S. Cl.
USPC .................. 701/22; 701/38; 701/42; 340/440

(58) Field of Classification Search
USPC ........... 701/1, 22, 35, 36, 41, 70, 124, 23, 38, 701/42, 71, 82; 340/425.5, 429, 438–440
See application file for complete search history.

(56) References Cited

FOREIGN PATENT DOCUMENTS

| EP | 0 338 538 A2 | 10/1989 |
|----|---|---|
| EP | 1 529 556 A2 | 5/2005 |
| EP | 1 759 972 A2 | 3/2007 |
| JP | 2002-538891 A | 11/2002 |
| JP | 2006-290195 A | 10/2006 |
| JP | 2007-069688 A | 3/2007 |
| JP | 2007-076413 A | 3/2007 |
| JP | 2007-160956 A | 6/2007 |
| JP | 2008-516582 A | 5/2008 |
| JP | 4162995 | 8/2008 |
| WO | 02/30730 A2 | 4/2002 |

OTHER PUBLICATIONS

Supplementary European Search Report dated Mar. 30, 2011.

*Primary Examiner* — Thomas Tarcza
*Assistant Examiner* — Edward Pipala
(74) *Attorney, Agent, or Firm* — Kenyon & Kenyon LLP

(57) ABSTRACT

To provide an inverted type moving body capable of continuing the inversion control with stability even when abnormality occurs in the inversion control while the moving body is moving, and a method of controlling the inverted type moving body. In an inverted type moving body including a rotational body having a circular cross section, a driving portion that rotationally drives the rotational body, a main body that supports the rotational body, and a control portion that maintains the inverted state of the main body by controlling the driving portion such that the rotational driving of the rotational body touching a floor surface is controlled, the control portion multiplies a signal obtained based on the inclined state of the main body by a predefined gain to calculate the driving amount of the rotational body for maintaining the inverted state, and reduces the gain when the inverted state of the main body is determined to be abnormal.

21 Claims, 8 Drawing Sheets

INVERTED TYPE MOVING BODY AND METHOD OF CONTROLLING SAME

This is a 371 national phase application of PCT/JP2008/066712 filed 17 Sep. 2008, claiming priority to Japanese Patent Application No. JP 2007-274769 filed 23 Oct. 2007, the contents of which are incorporated herein by reference.

TECHNICAL FIELD

The present invention relates to the so-called inverted type moving body that moves by controlling the rotational driving of a rotational body having a circular cross section so as to travel while maintaining the inverted state, and a method of controlling the inverted type moving body.

BACKGROUND ART

An inverted type moving body that travels while maintaining the inverted state by rotationally driving a rotational body having a circular cross section can moves while maintaining the inverted state by driving the rotational body such that the position of the center of its entire mass is always maintained in the vertical direction with respect to the point at which the rotational body touches the ground. In such an inverted type moving body, the rotational body is driven, by moving the center of gravity in the forward direction, such that the point at which the rotational body touches the ground is moved to the point directly below the forward-moved center of gravity, and consequently the inverted type moving body can move forward. Inverted type moving bodies like this that can control the direction and the speed of the movement by changing the position of the center of gravity have increasingly found application in carriages that carry and transport objects and transportation means that travels while carrying people. Such inverted type moving bodies have a merit that they have a shorter wheelbase in comparison to the so-called four-wheel stable type moving body having two front and two rear wheels, so that they requires a smaller space to change direction. Therefore, they are increasingly expected to play a role as a new type of transportation means.

Meanwhile, the inversion control to maintain the inverted state of such an moving body is carried out under the assumption that the wheel (rotational body) touches the ground in the flat floor surface, sufficient friction force is produced between the wheel and the floor surface, and the moving body sustains no or small external force from the outside. Therefore, if a situation in which the wheel is raised from the floor surface or a similar situation occurs, the wheel spins freely and the inverted state cannot be maintained with stability. In addition, if such a freely-spinning wheel touches foreign objects on the floor surface, it could send them flying. To prevent such situations, Patent document 1, for example, discloses an inverted type moving body having a function to prevent free-spinning. In the inverted type moving body disclosed Patent document 1, it proposes that when a situation in which the body of the moving body (the main body) is raised is detected, the rotational driving of the wheel is stopped so that the scattering of foreign objects, which would otherwise caused by the free-spinning of the wheel, is prevented.

[Patent Document 1]
Japanese Unexamined Patent Application Publication No. 2006-290195.

DISCLOSURE OF INVENTION

Technical Problems

However, when the wheel comes off the floor surface in the inverted type moving body disclosed in Patent document 1, it is determined that the inverted state cannot be maintained, and therefore the inverted type moving body stops the inversion control itself. Therefore, in order to allow the moving body to continue its traveling without suspending the inversion control, appropriate material and shape of the wheel have to be selected and an appropriate structure of the main body has to be designed so that a situation like the one described above in which the inversion control cannot be carried out does not occurs. However, by satisfying as much preconditions necessary to carry out the inversion control as possible in such a manner, flexibility in designing a moving body is restricted, and it poses a problem that the manufacturing cost increases.

The present invention has been made to solve these problems, and the object of the present invention is to provide an inverted type moving body capable of continuing the inversion control with stability even when abnormality occurs in the inversion control while the moving body is moving, and a method of controlling the inverted type moving body.

Technical Solution

An inverted type moving body in accordance with the present invention, which is provided to solve the above-described problems, includes: a rotational body having a circular cross section; a driving portion that rotationally drives the rotational body; a main body that supports the rotational body; and a control portion that maintains the inverted state of the main body by controlling the driving portion such that the rotational driving of the rotational body touching a floor surface is controlled; wherein the control portion multiplies a signal obtained based on the inclined state of the main body by a predefined gain to calculate the driving amount of the rotational body for maintaining the inverted state, and reduces the gain when the inverted state of the main body is determined to be abnormal.

In such an inverted type moving body, although driving torque to drive the rotational body for the inversion control is reduced when the inverted state falls into abnormality, the control in which the inverted state is maintained by weak torque still works. Therefore, it becomes possible to continue the inversion control even when abnormality occurs in the inverted state.

Furthermore, when the gain is reduced, it is preferable to change the degree of reduction in the gain in accordance with the degree of the abnormality in the inversion state of the main body. By doing so, since a certain amount of torque is obtained to carry out the inversion control when the degree of abnormality is small, it becomes possible to swiftly restore the inversion control after the inverted state is restored from the abnormality.

Furthermore, on such an occasion, an upper limit value and a lower limit value for the gain may be defined in accordance with the degree of abnormality in the inverted state of the main body in advance, and the gain is changed between these upper limit and lower limit values. By doing so, it becomes possible to always obtain the minimum gain necessary to maintain the inverted state by setting the lower limit value to an appropriate value, and to easily establish the maximum value for the driving torque that can be obtained when the inverted state is abnormal.

Furthermore, a speed detection portion to detect the speed of the main body may be further provided in such an inverted type moving body, so that the driving amount of the rotational body for maintaining the inverted state is calculated, by the control portion, based on a value obtained by multiplying a signal obtained based on the inclined state of the main body by a predefined gain, and a value obtained by multiplying a signal that is obtained by the speed detection portion based on the speed of the main body by a predefined gain. In such a moving body, since the driving amount of the rotational body can be determined based on the speed of the moving body when abnormality occurs in the inverted state, it is possible to prevent the moving body from decelerating abruptly and from becoming the excessively-braked state due to the change in the driving amount of the rotational body.

Furthermore, when the inverted state of the main body is determined to be abnormal in such a moving body, it is preferable to increase the gain that is multiplied to the signal obtained based on the speed of the main body. By doing so, it is possible to make the driving control of the rotational body by the speed control acts more strongly when the inverted state is abnormal.

Furthermore, a speed estimation portion to estimate the speed of the main body may be further provided in such an inverted type moving body, so that when the inverted state of the main body is determined to be abnormal, the control portion establishes the target speed based on a speed estimated by the speed estimation portion and increases the gain that is multiplied to the signal obtained based on the speed of the main body such that the target speed is achieved. By doing so, the driving amount to drive the rotational body when abnormality occurs in the inverted state can be easily obtained.

Note that although a sensor that detects the contact state between the rotational body and the floor surface (though not limited to) can be used as the technique to detect abnormality in the inverted state, other techniques that do not use any sensors like that can be also used to detect abnormality in the inverted state. That is, the above-mentioned inverted type moving body may further includes a measurement portion that simultaneously obtains the actual measurement values of four parameters including an inclination angle and an inclination angular speed with respect to the vertical direction of the main body, and a rotation angle and a rotation angular speed of the rotational body, and an estimation portion that estimates, based on the actual measurement values of three parameters selected from the actual measurement values of the four parameters obtained by the measurement portion and a control amount of the rotational body, a value of the non-selected one other parameter, so that abnormality in the inverted state of the main body is detected based on the deviation between the estimated value and the actual measurement value of the non-selected parameter. Note that when the deviation between the actual measurement value and the estimated value obtained in the above-described manner, it is also possible to determine the degree of abnormality in the inverted state of the main body based on the amount of this deviation. When the degree of abnormality in the inverted state is determined based on the amount of the deviation, it is preferable to examine the relation between the state where the inverted state becomes abnormal and the deviation between the actual measurement value and the estimated value in advance by experiment or the like.

Furthermore, in an inverted type moving body, an estimated value of one parameter that is estimated from the other three parameters is substantially conforms to its actual measurement value in the above-described four parameters when the moving body is traveling on an ideal flat surface. In other words, if the actual measurement value of the one parameter is significantly different from its estimated value, it means that the inverted state of the main body is abnormal. Therefore, by focusing attention on the deviation between the actual measurement value of one parameter and its estimated value as described above, it is possible to determine abnormality of the inverted state of the main body without using a special sensor or the like.

Furthermore, as for the technique to detect abnormality in the inverted state as described above, at least two combinations of three parameters may be selected from the actual measurement values of the four parameters, and abnormality in the inverted state of the main body may be detected based on the deviation between the estimated value and the actual measurement value of the other one parameter obtained for each of those combinations. By detecting abnormality in the inverted state based on the deviations obtained in a plurality of combinations in such a manner, it is possible to determine the abnormality of the inverted state more accurately.

Furthermore, as a more specific technique to detect abnormality in the inverted state, each of an actual measurement value and an estimated value of the inclination angle with respect to the vertical direction of the main body and an actual measurement value and an estimated value of the rotation angular speed of the rotational body may be obtained, and abnormality in the inverted state of the main body may be detected based on the deviations between these actual measurement values and estimated values. That is, it is known that the deviation between an actual measurement value and an estimated value of the inclination angle with respect to the vertical direction of the main body and the deviation between an actual measurement value and an estimated value of the rotation angular speed of the rotational body satisfy simple known relations when the inverted type moving body is moving on an ideal flat surface. Therefore, by focusing attention on the relations between these deviations, it is possible to easily detect abnormality of the inverted state.

When a technique to detect abnormality in the inverted state like this is used, the deviations between actual measurement values and estimated values of the inclination angle with respect to the vertical direction of the main body and the deviations between actual measurement values and estimated values of the rotation angular speed of the rotational body may be obtained continuously and simultaneously, and abnormality of the inverted state of the main body may be detected based on a track obtained by arranging these deviations as coordinates on a phase plane where one axis represents the deviation between the actual measurement value and the estimated value of the inclination angle and the other axis represents the deviation between the actual measurement value and the estimated value of the rotation angular speed of the rotational body. By arranging the deviations between actual measurement values and estimated values of the inclination angle and the deviations between actual measurement values and estimated values of the rotation angular speed of the rotational body in a phase plane where one axis represents the deviation between the actual measurement value and the estimated value of the inclination angle and the other axis represents the deviation between the actual measurement value and the estimated value of the rotation angular speed of the rotational body as parameters in this manner, a curved track is obtained in the phase plane when the inverted type moving body moves on a normal flat surface. Conversely, if abnormality occurs in the inverted state (e.g., when it runs over a large step or when large disturbance is applied), the track is positioned at a place widely displaced from the curved line. Therefore, the abnormality in the inverted state can be easily detected.

Furthermore, as a more specific technique to detect abnormality in the inverted state, it is possible to establish a predefined area in the phase plan, and then to determine the inverted state of the main body as abnormal when the obtained track is not contained within the area. In addition to this technique, it is also possible to use a technique where the inverted state of the main body is determined to be abnormal when the gradient of the track on the phase plane exceeds a predefined threshold. An actual technique to detect abnormality in the inverted state may be selected from these techniques as appropriate according to the circumstance. Furthermore, these techniques may be used together. By combining two or more techniques to detect abnormality in this manner, it is possible to detect abnormality of the inverted state of the main body more reliably.

Furthermore, when abnormality in the inverted state is detected by a technique like this, it is also possible to determine the degree of the abnormality in the inverted state. That is, by establishing a predefined area in the phase plane and obtaining a distance by which the obtained track is separated from the area, it is also possible to determine the degree of the abnormality in the inverted state of the main body based on the obtained distance since this distance is roughly in proportion to the degree of the inverted state. Similarly, it is also possible to determine the degree of abnormality in the inverted state of the main body based on the gradient of the track on the phase plane.

Note that the above-described main body may be one having a boarding platform to put a passenger thereon. Such an inverted type moving body carries a human thereon as a passenger, and can be used as a transport means capable of moving in accordance with commands from the passenger or moving autonomously.

Note that although a spherical or cylindrical structure can be also used for the rotational body, it is preferable that a pair of wheels is arranged in parallel on both sides of the main body with respect to the moving direction and that the rotation of each wheel can be independently driven. Such an inverted type moving body can not only move freely in front-back and left-right directions, but also carry out movements such as a revolution by rotating the pair of wheels in opposite directions with each other.

Furthermore, the present invention, which is to provide a method of controlling an inverted type moving body, provides a method of controlling the inverted state of an inverted type moving body, the inverted type moving body including: a rotational body having a circular cross section; a driving portion that rotationally drives the rotational body; a main body that supports the rotational body; and a control portion that maintains the inverted state of the main body by controlling the driving portion such that the rotational driving of the rotational body touching a floor surface is controlled; the method of controlling the inverted state of an inverted type moving body including: an inclined state acquisition step to obtain a signal obtained based on the inclined state of the main body; and a driving amount calculation step to calculate the driving amount of the rotational body for maintaining the inverted state by multiplying the signal obtained based on the inclined state of the main body by a predefined gain; and the method of controlling the inverted state of an inverted type moving body further including: an inverted state decision step to determine whether the inverted state of the main body is abnormal or not; and a gain reduction step to reduce the gain when the inverted state of the main body is determined to be abnormal.

By controlling an inverted type moving body in such a manner, driving torque to drive the rotational body for the inversion control is reduced when the inverted state falls into abnormality, and the control in which the inverted state is maintained by the weakened torque works. Therefore, it becomes possible to continue the inversion control even when abnormality occurs in the inverted state.

Furthermore, the degree of reduction in the gain may be changed in accordance with the degree of the abnormality in the inversion state of the main body in the gain reduction step. By doing so, since a certain amount of torque is obtained to carry out the inversion control when the degree of abnormality is small, it becomes possible to swiftly restore the inversion control after the inverted state is restored from the abnormality.

Furthermore, it is more preferable to change the degree of reduction in the gain in accordance with the degree of the abnormality in the inversion state of the main body in the gain reduction step. By doing so, since a certain amount of torque is obtained to carry out the inversion control when the degree of abnormality is small, it becomes possible to swiftly restore the inversion control after the inverted state is restored from the abnormality.

Furthermore, a speed detection portion to detect the speed of the main body may be further included in such a method of controlling an inverted type moving body, so that the driving amount of the rotational body for maintaining the inverted state is calculated, in the driving amount calculation step, based on a value obtained by multiplying a signal that is obtained based on the inclined state of the main body in the inclined state acquisition step by a predefined gain, and a value obtained by multiplying a signal that is obtained based on the speed of the main body in the speed detection step by a predefined gain. By doing so, since the driving amount of the rotational body can be determined based on the speed of the moving body when abnormality occurs in the inverted state, it is possible to prevent the moving body from decelerating abruptly and from becoming the excessively-braked state due to the change in the driving amount of the rotational body.

Furthermore, in such a method of controlling an inverted type moving body, when the inverted state of the main body is determined to be abnormal in the inverted state decision step, it is preferable to further include a gain increase step to increase the gain to be multiplied to the signal obtained based on the speed of the main body. By doing so, it is possible to obtain an advantageous effect that the driving control of the rotational body by the speed control can act more strongly when abnormality occurs in the inverted state.

Furthermore, in such a method of controlling an inverted type moving body, when the inverted state of the main body is determined to be abnormal in the inverted state decision step, it is preferable to further include a gain increase step to increase the gain that is multiplied to the signal indicating the speed of the main body. Carrying out such an action is preferable because it is possible to make the driving control of the rotational body by the speed control act more strongly when abnormality occurs in the inverted state.

Furthermore, such a method of controlling an inverted type moving body may further includes a speed estimation step to estimate the speed of the main body may be further included in, and the method may be configured such that when the inverted state of the main body is determined to be abnormal in the inverted state decision step, the target speed is established in the driving amount calculation step based on a speed estimated at the speed estimation step and the gain that is multiplied to the signal obtained based on the speed of the main body is increased such that the target speed is achieved. By doing so, the driving amount for driving the rotational body can be easily obtained when abnormality occurs in the inverted state.

Advantageous Effects

As has been explained above, the present invention can provide an inverted type moving body capable of continuing the inversion control with stability even when abnormality occurs in the inversion control while the moving body is moving, and a method of controlling the inverted type moving body.

EXPLANATION OF REFERENCE

1 MOVING BODY (INVERTED TYPE MOVING BODY)
10 MAIN BODY
11 BOARDING PLATFORM
12 SEAT
13 BACKREST PORTION
14 LEG SUPPORT PORTION
15 FOOTREST PORTION
18 CONNECTION MEMBER
18a ACCELERATION SENSOR (SPEED ESTIMATION PORTION)
18b GYROSCOPE (MEASUREMENT PORTION)
20 CONTROL BOX
21, 22 MOTORS (DRIVING PORTIONS)
23 CONTROL PORTION
23a STORAGE AREA
24 ROTATION ANGLE SENSOR (MEASUREMENT PORTION)
25 BATTERY
26 DETECTION PORTIONS
31, 32 DRIVING WHEELS (ROTATIONAL BODIES)
P FLOOR SURFACE

BEST MODES FOR CARRYING OUT THE INVENTION

First Embodiment of the Invention

An inverted type moving body and a method of controlling the inverted type moving body in accordance with a first embodiment of the present invention are explained hereinafter with reference to FIGS. 1 to 5.

Figure 1:
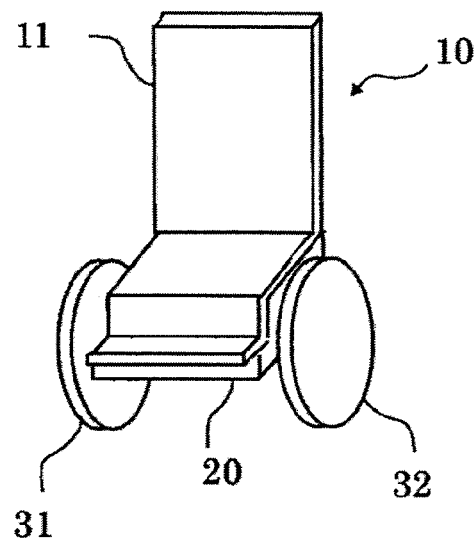
FIG. 1 is a schematic diagram schematically illustrating the external appearance and the internal structure of an inverted type moving body in accordance with a first embodiment of the present invention.
Figure 2:
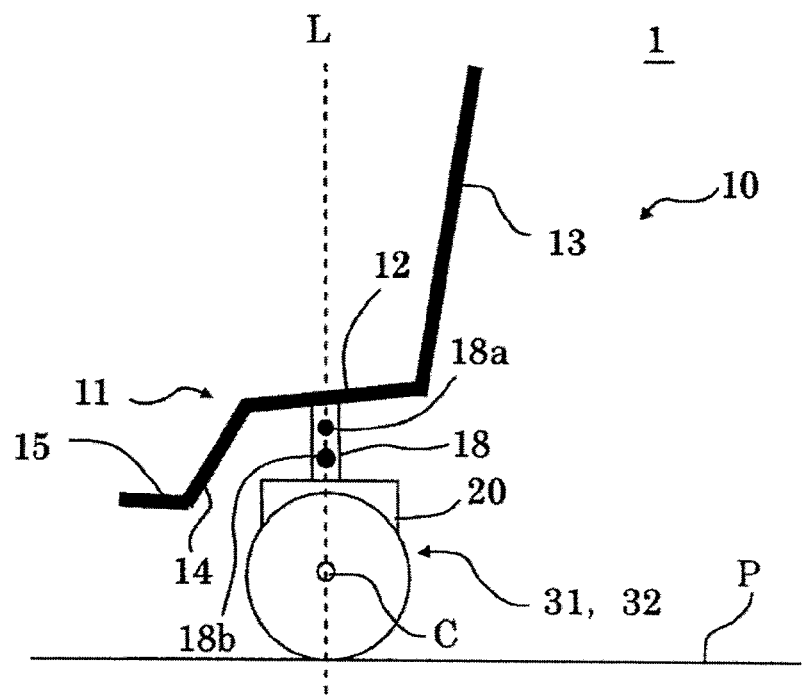
FIG. 2 is a conceptual diagram illustrating the appearance of the inverted type moving body shown in FIG. 1 when viewed in a transverse direction by using a conceptual model.

FIG. 1 is a schematic diagram schematically illustrating an inverted type moving body (hereinafter simply called "moving body") 1 for which movement control can be carried out by manipulation by a passenger on a floor portion, i.e., in a moving area, in a state in which the moving body carries the passenger thereon, and FIG. 2 is a conceptual diagram illustrating the appearance of the moving body 1 shown in FIG. 1 when viewed in a transverse direction by using a conceptual model. The details are explained hereinafter.

As shown in FIG. 1, the moving body 1 includes a main body 10 that includes a boarding platform 11 to put a passenger thereon, a first driving wheel 31 and a second driving wheel 32 as a pair of opposing rotational bodies, and a control box 20 that is connected to the main body 10 and controls the rotational driving of the first driving wheel 31 and the second driving wheel 32. This control box 20 includes motors 21 and 22 that serves as a driving portion to rotationally drive those driving wheels around axles C1 and C2 as explained later, a battery 25 to supply electrical power to the motors, and a control portion 23 to control the movement of the moving body 1 within it.

The main body 10 includes a boarding platform 11 composed of a frame having a predefined shape, and a connection member 18 to connect this boarding platform 11 to the control box 20. The boarding platform 11 includes a flat panel shaped seat 12 on which a passenger sits, a backrest portion 13 to support the back of the passenger, a leg support portion 14, and a footrest portion 15.

The backrest portion 13 is fixed so as to extend roughly in vertically upward direction with respect to the seat 12, and contacts with the entire area of the back of the passenger and supports the weight of the passenger when the seated passenger shifts his/her weight backward. Similarly, the leg support portion 14 is fixed to the seat 12 at one end so as to extend roughly in the vertically downward direction, and the footrest portion 15 is fixed at the other end. Therefore, the leg support portion 14 contacts with the legs of the seated passenger and partially supports the weight of the passenger. Then, the footrest portion 15 is designed with predefined shape and size such that the surface of the footrest portion 15 contacts with the surfaces of the soles of the seated passenger with his/her leg portions bending at the knee portions.

Furthermore, the connection member 18 is fixed to the control box 20 at one end and connected to the boarding platform 11 at the other end so that the boarding platform 11 can freely turn in the forward-backward direction of the moving body (traveling direction of the moving body) with respect to the control box 20. Then, the timing and the amount of the turning movement of the boarding platform 11 is controlled by driving means such as a motor (not shown) with a signal from the control portion 23.

Furthermore, an acceleration sensor 18a to detect the acceleration of the main body and a gyroscope 18b to measure the inclination angle and the inclination angular speed of the main body 10 with respect to the vertical direction (extending direction of the line segment L in FIG. 2) are attached to this connection member 18. The acceleration sensor 18a detects an acceleration in the traveling direction generated by force acting on the main body, and transmits a signal (acceleration signal) based on the detected acceleration to the control portion 23. In the control portion 23, after an appropriate filtering process is carried out on the received acceleration signal, an integral process is carried out in order to estimate the speed of the main body, i.e., the speed of the moving body. That is, the acceleration sensor 18a and the control portion 23 constitute the speed estimation portion in the present invention. Note that the actual speed of the moving body can be obtained from a signal from a rotation angle sensor that detects the rotation angle and the rotation angular speed of the driving wheels as explained later.

Furthermore, the acceleration sensor 18a is also used to detect the magnitude and the direction of action of external force acting on the moving body. That is, when the acceleration value obtained by the acceleration sensor 18a has a magnitude in the order that may not be obtained under normal circumstances, the control portion 23 can determine that force (external force) is applied from the outside to the main body.

The gyroscope 18b attached to the connection member 18 is configured to detect an amount by which the inclination of the gyroscope 18b itself is changed with respect to the vertical direction within a predefined time period, e.g., an inclination angular speed, and to convert the detected angular speed into an electrical signal and output the converted electrical signal. Furthermore, after removing noise or the like from the inclination angular speed signal obtained based on the detected inclination angular speed through a filter (not shown), the gyroscope 18b transmits it to the control portion 23. In the control portion 23, it is possible to obtain the inclination angle and the inclination angular speed of the main body 10 by integrating inclination angular speeds of the connection member 18 (i.e., main body) that are detected at minute time intervals while the moving body 1 is moving.

Furthermore, although the sensor that detects inclination angles only for the moving direction (forward-backward direction) of the main body 10 is used in this embodiment of the present invention, it is also possible to use a sensor that detects inclination angles for left-right direction.

Furthermore, the inclination angle and the inclination angular speed with respect to the vertical direction of the main body can be also measured by an acceleration signal obtained from the above-described acceleration sensor 18a without using such a gyroscope. Therefore, it is also possible to detect the inclination angle and the inclination angular speed of the main body, and the speed of the moving body, without using the gyroscope, by using only the above-described acceleration sensor 18a.

A manipulation portion including a manipulation lever such as a joystick to transmit a manipulation signal to the control portion 23 is provided in the boarding platform 11, so that the moving direction and the moving speed of the moving body 1 are controlled by a passenger riding on the boarding platform 11 by manipulating the manipulation portion.

Figure 3:
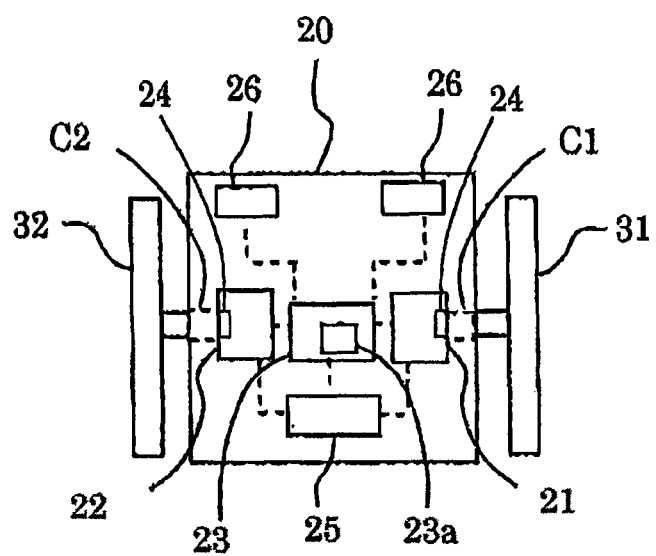
FIG. 3 is a schematic diagram schematically illustrating the internal structure of a control box of the moving body shown in FIG. 1 as the inside of the control box is viewed in a partial cross section.

Furthermore, the control box 20 includes support axles C1 and C2 to support the first driving wheel 31 and the second driving wheel 32 inside of the box shaped frame as shown in FIG. 3. The control box 20 also includes motors 21 and 22 that serve as a driving portion to drive those axles, a control portion 23 to control the rotational driving action of these motors, a rotation angle sensor 24 to detect the rotation angle and the rotation angular speed of the driving wheels, a battery 25 to supply electrical power to these components, and detection portions 26 and 26 that are located at the front and optically recognize the shape or a similar feature of the floor surface on which the moving body moves, and an obstacle or the like.

The motors 21 and 22 are to independently drive the above-described driving wheels, and change the number of revolutions of the driving wheels by providing rotational torque to the driving wheels based on a signal from the control portion 23, and thereby enabling the moving body 1 to change its traveling direction and to carry out revolution movement. Note that the motor is equipped with a temperature sensor (not shown) to detect an overheated state caused by the electrical power supply, so that it is possible to avoid a state in which the motor cannot produce the maximum torque by detecting the overheated state with this sensor and outputting a detection signal to the control portion (which is explained later).

The control portion 23 is a small computer including a specific CPU and a storage area 23a such as a memory, and this storage area 23a stores a certain program to determine a driving amount by which the driving wheels are driven based on an input signal, as well as map information and the like about the moving area on which the moving body moves.

The rotation angle sensor 24 detects the rotation angular speed of the driving wheels, and transmits an electrical signal (rotation angular speed signal) obtained based on the detected rotation angular speed to the control portion 23. The control portion 23 obtains the rotation angle and the rotation angular speed of the driving wheels based on this rotation angular speed signal. Furthermore, in addition to driving the driving wheels and obtaining the moving speed of the moving body based on the signal from the above-described rotation angle sensor 24 and the diameter of the driving wheels, the control portion 23 can also detect a state in which the driving wheels come off the floor surface and spin freely. That is, in the control portion 23, it is possible to determine that the driving wheels come off the floor surface when the number of revolutions increases abruptly even though the driving force to drive the driving wheels is not changed or a similar situation occurs.

The battery 25 is electrically connected to terminals for being charged (not shown) that are provided on and extend from the surface of the control box 20, so that the battery 25 is supplied with electrical power and electrically charged by contacting terminals for charging that are provided in a charging station with the above-mentioned terminals for being charged.

The detection portions 26 and 26 are sensors that are arranged in a bilaterally symmetrical manner on the lower front surface of the control box 20 as detection means, and detect the shape of the floor surface located in front and below the control box 20 by radiating an infrared laser from a light source provided in each of the sensors, changing the radiation direction of the laser such that the laser oscillates in the horizontal and vertical directions, and receiving the reflected light. The control portion 23 detects the presence of a step, an obstacle, and the like existing on the floor surface from the information about the shape of the floor surface detected by the detection portion 26, carries out route search for evading these obstacles and the likes, and carries out a similar process.

Next, control carried out by the control portion 23 to move the moving body 1 while maintaining the inverted state is explained hereinafter with reference to a block diagram showing the internal structure of the control portion 23 shown in FIG. 4.

Figure 4:
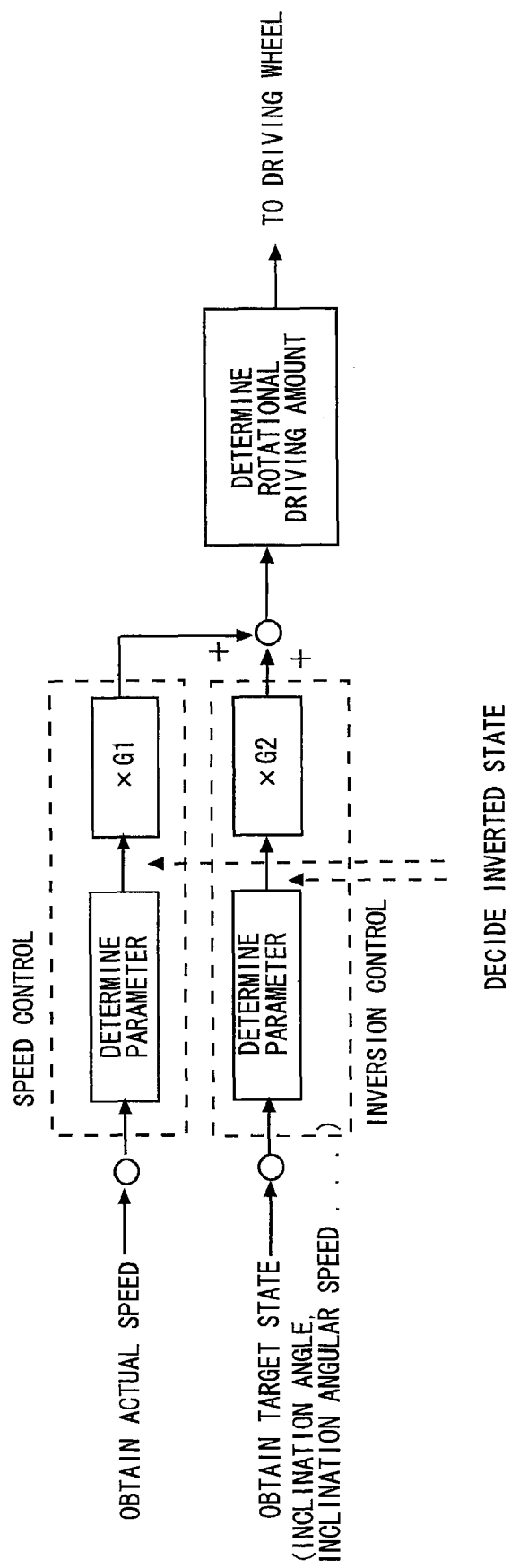
FIG. 4 is a block diagram showing the internal structure of a control portion that carries out control such that the moving body shown in FIG. 1 moves while maintaining its inverted state.

As shown in FIG. 4, after obtaining target state quantity (inclination angle/inclination angular speed of the main body, rotation angle/angular speed of the driving wheels, and the like), the above-described control portion 23 carries out, based on these state quantities, both the inversion control to control the rotational driving of the driving wheels such that the moving body travels in the inverted state, and the speed control to control the rotational driving of the driving wheels based on the speed of the moving body in the moving body 1 in accordance with this embodiment of the present invention. The inversion control is established based on a control theory that calculates a control amount obtained by multiplying a signal obtained based on the inclined state of the main body (inclination angle $\eta$ of the main body) by a predefined gain G1. Meanwhile, the speed control calculates a control amount obtained by multiplying a signal obtained based on the actual speed of the moving body obtained from the diameter and the rotation speed of the driving wheels by a predefined gain G2. Then, a value obtained by adding up both of the calculated control amounts is output as a rotational driving amount of the driving wheels touching the floor surface, so that the rotational driving of the driving wheels is controlled. Note that the inversion control may be also constructed by using a known control system such as PID control as a substitute.

Note also that the values of the gains G1 and G2 are changed as appropriate based on a signal from detection means (e.g., the rotation angle sensor 24, the acceleration sensor 18a, and the like) that is provided in the moving body and detects abnormality in the inverted state. That is, a smaller value is used for the gain G2 for the speed control and a larger value is used for the gain G1 for the inversion control in the normal traveling state (i.e., when abnormality is not occurring in the inverted state of the moving body) so that the rotational driving of the driving wheels is controlled based on the inclined state of the main body. In this case, since the major portion of the control to rotationally drive the driving wheels is carried out by the inversion control, the rotational driving of the first driving wheel 31 and the second driving wheel 32 is controlled such that the straight line L that extends from the point at which the driving wheels of the moving body 1 touch the floor surface P and passes through the axle C and the straight line that connects between the position of the center of gravity of the moving body 1 and the axle C form the target inclination angle $\eta 0$ (e.g., $\eta 0=0$ degrees).

Meanwhile, when the detection means determines that abnormality occurs in the inverted state of the moving body, the value of the gain G1 is reduced and the value of the gain G2 is increased so that the control amount of the rotational driving by the inversion control is weakened and the control amount of the rotational driving by the speed control is strengthened. In this case, although the proportion of the inversion control is reduced and the proportion of the speed control is increased in the control to rotationally drive the driving wheels, the inversion control is still partially carried out. Note that the value of the gain G2 may be determined based on the obtained actual speed. For example, the value of the gain G2 may be determined so as to provide driving force that would be necessitated in the case where the actual speed obtained at the time when abnormality occurs in the inverted state is defined as the target speed. Note that the way of determining the gain G2 is not limited to this method, and a speed lower than the obtained actual speed may be defined as the target speed.

When the inverted state is in the normal state, a moving body constructed in this manner is controlled such that the position of the center of gravity of the moving body is restored to a point vertically above the axle of the driving wheels by advancing the first driving wheel 31 and the second driving wheel 32 in a direction in which the main body 10 is inclined. Then, by applying appropriate torque to the pair of driving wheels contacting with the floor surface, the inverted state is maintained such that the inclination angle formed by the main body with respect to the vertical direction does not exceed a certain constant value, and traveling movements such as a forward movement, a backward movement, a standstill, a right turn, a left turn, a left revolution, a right revolution, and the like can be performed while maintaining that inverted state.

Furthermore, the control portion 23 autonomously creates its movement path based on map information stored in the storage area 23a or the like. This map information is composed of a grid map obtained by imaginarily drawing grid lines that connect between lattice points arranged in roughly constant intervals on the entire shape of the floor surface P on which the moving body travels, and a location corresponding to the position of the moving body 1 itself and a movement termination point, i.e. the target point, and the moving direction of the moving body 1 at the movement termination point are specified by using grid units surrounded by these grid lines. Note that the interval of the lattice points in the grid map can be changed as appropriate depending on conditions such as the minimum curvature along which the moving body 1 can move and the accuracy with which the moving body 1 recognize absolute positions. Then, the control portion 23 uses the position of the moving body itself specified on this grid map as a movement start point, creates a movement path from the movement start point to the movement termination point, i.e., the destination, calculates the position of the moving body itself in real time from the moving speed and the traveled distance obtained from the number of revolutions of the driving wheels and the like, and carries out the movement control such that the moving body moves along the created movement path.

Figure 5:
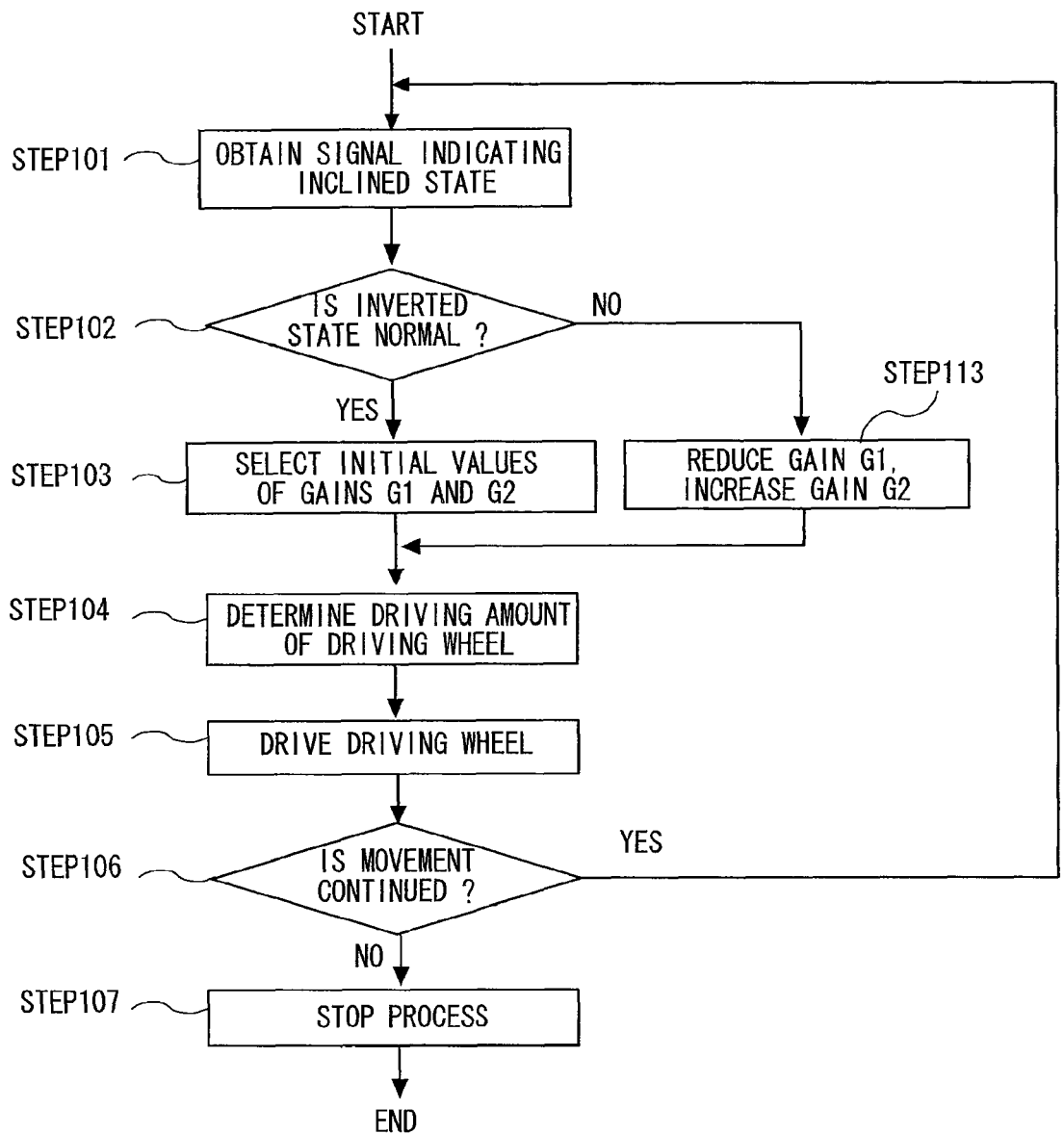
FIG. 5 is a flowchart for illustrating a procedure to move a moving body 1 while maintaining its inverted state in an inverted type moving body in accordance with the first embodiment of the present invention.

Next, control that is carried out to move the moving body 1 while maintaining the inverted state after abnormality is detected in the inverted state as described above is explained with reference to a flowchart shown in FIG. 5.

Firstly, when the movement of the moving body 1 is started, the control portion 23 obtains a signal indicating the inclined state of the main body by receiving signals from the acceleration sensor 18a and the gyroscope 18b (STEP 101). Then, the control portion 23 determines whether the inverted state is normal or not based on values such as the number of revolutions of the driving wheels and the magnitude of external force applied to the main body that are obtained from signals from the acceleration sensor 18a and the rotation angle sensor 24 while the moving body 1 is moving (STEP 102).

When the inverted state is determined to be normal at the Step 102, the gain G1 used for the inversion control and the gain G2 used for the speed control are used without changing their values from the initial values (STEP 103) and the driving amount to drive the driving wheels is determined based on these gains (STEP 104). Note that the initial value for the gain G1 is so large in comparison to the initial value for the gain G2 that a value obtained by dividing the gain G2 by the gain G1 can be regarded as substantially zero. After determining the driving amount, the control portion 23 transmits a driving signal, so that the driving wheels are rotationally driven based on the determined driving amount (STEP 105).

On the other hand, when the inverted state is determined to be abnormal in the Step 102, the value of the gain G1 is reduced, but the value of the gain G2 is increased (STEP 113). In this case, values to which the gains G1 and G2 are changed are established in advance in accordance with the weight, the maximum speed, the shape, and the like of the moving body. Then, the driving amount to drive the driving wheels is determined by using the changed gains G1 and G2 (STEP 104), and the driving wheels are driven in accordance with the determined driving amount in a similar manner to the case where the inverted state is normal (STEP 105).

After the driving wheels are driven in such a manner, the decision whether the traveling is continued or not is made (STEP 106), and if the traveling is to be continued, the process returns to the Step 101 and the inclined state of the main body is monitored. At this point, if it is determined that the inverted state is restored to the normal state at the Step 102, the gains G1 and G2 are restored to the initial values. Note that if it is determined that the traveling is not to be continued at the Step 106, a predefined stop process is carried out (STEP 107) and it waits for the next command.

In this manner, in accordance with an inverted type moving body in accordance with this embodiment of the present invention, even when abnormality occurs in the inverted state, driving torque to drive the rotational bodies still acts for the inversion control, and the driving torque acts such that the moving body moves at a speed close to the speed of the moving body at the time when the abnormality occurs in the inverted state. Therefore, even if abnormality occurs in the inverted state, the moving body can not only continue the inversion control, but also prevent the moving body from decelerating abruptly and from becoming the excessively-braked state due to the change in the driving amount of the rotational bodies based on the abnormality of the inverted state.

Note that although the decision whether the inverted state is abnormal or not is made based on values from the acceleration sensor and the rotation angle sensor, and the values of the gains are changed if the inverted state is abnormal in the inverted type moving body and the method of controlling the inverted type moving body in accordance with this embodiment, the present invention is not limited to this embodiment. That is, the degree of abnormality in the inverted state may be detected, and the proportions of the inversion control and the speed control in the rotational driving may be changed according to this degree of the abnormality. An example like this is explained hereinafter by using a next second embodiment of the present invention.

Second Embodiment of the Invention

Figure 6:
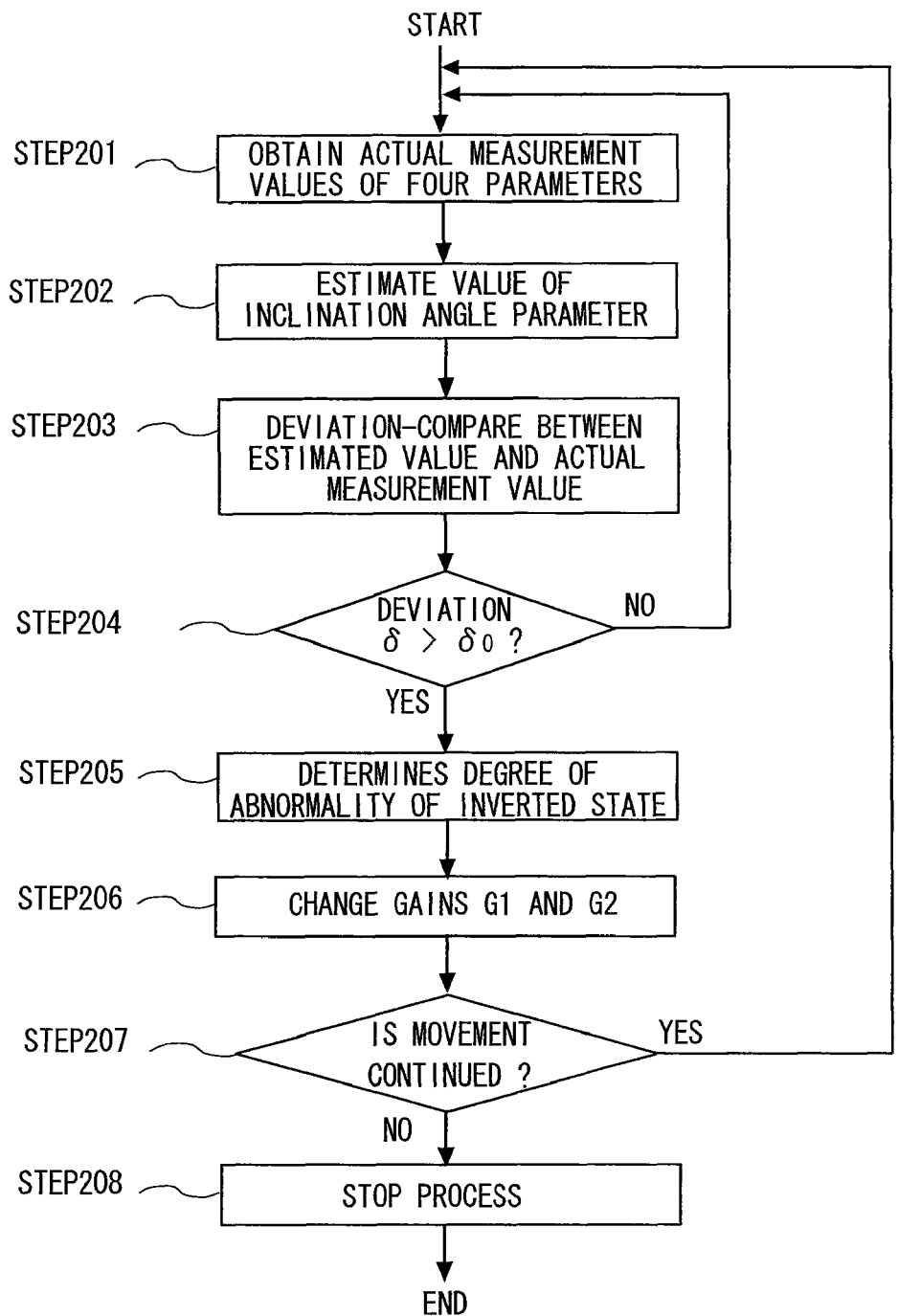
FIG. 6 is a flowchart for illustrating a procedure to move the moving body 1 by detecting the degree of abnormality in the inverted state of the moving body 1 and determining the driving amount of the driving wheels according to the detected degree of abnormality in an inverted type moving body in accordance with a second embodiment of the present invention.

An inverted type moving body and a method of controlling the inverted type moving body in accordance with a second embodiment of the present invention are explained hereinafter with reference to FIGS. 6 to 8. A moving body in accordance with this embodiment includes almost the same structures as the moving body explained in the above-described first embodiment. However, in contrast to the above-described embodiment, the deviations between actual measurement values and estimated values are obtained for two variables, i.e., the rotation angular speed of the rotational body (driving wheel) and the inclination angle of the main body, and abnormality in the inverted state is detected and the degree of the abnormality is determined based on these deviations. The details are explained hereinafter. In this embodiment of the present invention, since the moving body has the same or similar structures to those of the moving body explained in the above-described embodiment, explanation of their specific structures is omitted.

In a method of controlling an inverted type moving body in accordance with this embodiment of the present invention, the actual measurement values of four parameters during the traveling, i.e., the inclination angle and the inclination angular speed with respect to the vertical direction of the main body 10, and the rotation angle and the rotation angular speed of the driving wheels are used to determine whether the inverted state is abnormal or not in the form of "ON/OFF" and to detect the degree of the abnormality, and the values of the gains are changed according to the detected degree of the abnormality. The details are explained hereinafter with reference to a flowchart shown in FIG. 6.

Firstly, the moving body 1 moving on the floor surface P obtains the actual measurement values of the four parameters (the inclination angle and the inclination angular speed with respect to the vertical direction of the main body 10, and the rotation angle and the rotation angular speed of the rotational bodies (driving wheels)) simultaneously (STEP 201). Specifically, the control portion 23 simultaneously obtains an inclination angle signal from the above-described acceleration sensor 18a and a rotation angular speed signal from the rotation angle sensor 24, and simultaneously obtains the four parameters based on these signals.

Next, the control portion 23 obtains an estimated value of the inclination angle of the main body by using three parameters other than the inclination angle of the main body (i.e., the inclination angular speed of the main body, and the rotation angle and the rotation angular speed of the driving wheels), and the driving amount of the rotational bodies (STEP 202). Then, deviation is obtained by comparing the actual measurement value of the inclination angle obtained at the Step 201 with the estimated value of the inclination angle obtained at the Step 202 (STEP 203), and the decision whether its deviation $\delta$ exceeds a predefined threshold $\delta_0$ or not is made (STEP 204). When the deviation $\delta$ does not exceed the threshold $\delta_0$, the process returns to the Step 201 and the acquisition of the actual measurement values of the parameters is continued. However, when the deviation exceeds the threshold $\delta_0$, the degree of abnormality in the inverted state is determined based on the magnitude of the deviation (STEP 205), and then the values of the gains G1 and G2 are changed according to the degree of the abnormality (STEP 206). As for the technique to determine the degree of abnormality in the inverted state, a technique in which thresholds are defined in a stepwise manner in advance and the degree of abnormality is determined based on the threshold level that the obtained deviation reaches may be used.

Then, after the values of the gains are changed, the decision whether the traveling can be continued or not is made (STEP 207). If the continuation of the traveling is possible, the process returns to the Step 201 and the traveling is continued.

If the inverted state cannot be maintained and the continuation of the traveling is determined to be impossible, the inversion control is stopped and a predefined stop process is carried out (STEP 208), and it waits for the next command.

Note that when the degree of abnormality in the inverted state is extremely large in the above-described Step 207 (e.g., when external force sufficiently large to make maintaining the inverted state impossible is exerted on the main body), a technique in which the moving body makes a transition to a stabled state by inclining the bottom surface of the main body toward the floor surface until it touches the floor surface may be used as the predefined stop process carried out in the Step 208 (although an illustration and the like for it is omitted). In this case, it is preferable to provide a support wheel or the like on the bottom surface of the footrest portion 15, because the friction force that occurs as the bottom surface of the main body touches the floor surface is reduced. Note that as for the technique to detect the contact between the bottom surface of the main body and the floor surface, a technique in which a touch sensor or the like is provided on the bottom surface of the main body, and the time when this sensor detects an impact on the support wheel is defined as the time when the main body touches the floor surface may be used. Note that instead of using such a touch sensor, the time when the main body touches the floor surface may be determined based on a signal obtained by the above-described acceleration sensor. Furthermore, in a case where a moving body like this is, for example, equipped with a bar that is configured to extend from and retract into the main body and has a support wheel at its tip, the support wheel may be extended away from the main body and touched to the floor surface without inclining the main body itself. Furthermore, as for the structure of the support wheel, the support wheel may be fixed to either of the front or the rear of the main body, or may be fixed to each of the front and rear of the main body.

Furthermore, although the values for the gains G1 and G2 that are changed at the STEP 206 may be separately increased or decreased, these gains may be also changed between a predefined upper limit value and a predefined lower limit value. For example, the degree of abnormality to be detected may be determined in a stepwise manner (S1, S2, S3, S4), and corresponding gains G1 and G2 may be defined such that they have hysteresis characteristics for these steps. Note that specific values for the above-described steps of abnormal states are determined in advance by carrying out experiment or the like. As a specific example, a state at which the moving body starts to become unstable (starts to go out of control or to oscillate) by the control amount of the inversion control portion carrying out the inversion control as the moving body is pushed by the presumed maximum external force is defined as the S3. Next, S1, S2, and S4 are determined by using the above-described S3 as a reference in such a manner that S2 is a state for which the degree of abnormality is smaller than that of S3 (i.e., more stable state), S1 is sufficiently more stable state than S2, and S4 is a more unstable state than S3. By determining S1 to S4 in such a manner, stabilization control is performed by the inversion control portion with the maximum performance for disturbance smaller than the presumed maximum external force, and when external force larger than the presumed maximum value is applied, it is determined that abnormal state is occurring and an out-of-control state can be prevented from occurring by reducing the gain related to its control amount.

Figure 7:
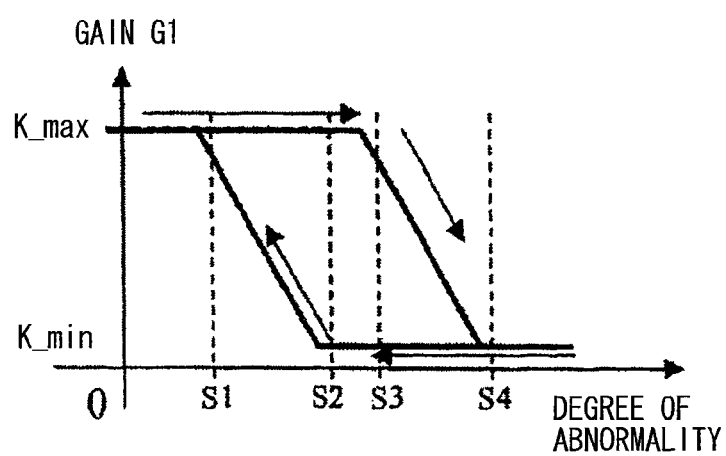
FIG. 7 is a graph illustrating an example of the relation between a gain G1 and the degree of abnormality in the inverted state of the moving body in accordance with the second embodiment of the present invention.
Figure 8:
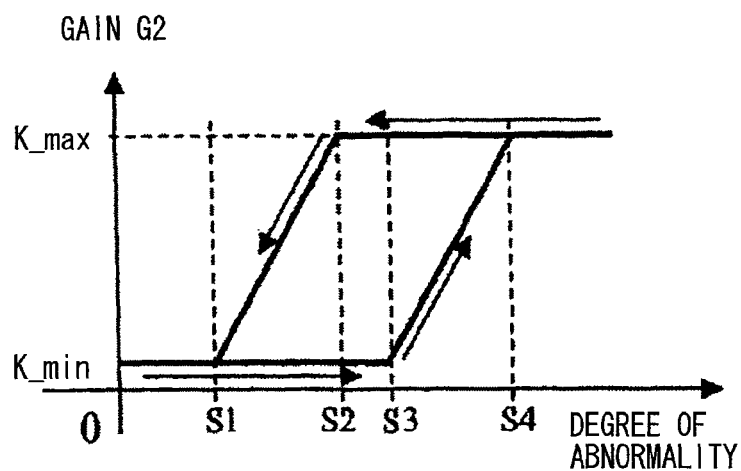
FIG. 8 is a graph illustrating an example of the relation between a gain G2 and the degree of abnormality in the inverted state of the moving body in accordance with the second embodiment of the present invention.

FIGS. 7 and 8 show examples defining such relations between the degree of abnormality in the inverted state and the gain. FIG. 7 is a graph illustrating the relation between the gain G1 and the degree of abnormality in the inverted state of the moving body, and FIG. 8 is a graph illustrating the relation between the gain G2 and the degree of abnormality in the inverted state of the moving body. As shown in these graphs, the upper limit values and the lower limit values for the possible values of the gains G1 and G2 are defined, and their possible values are changed between these upper limit values (K_max) and lower limit values (K_min). Note that although the same maximum value and the minimum value are used for each of the gains shown in FIGS. 7 and 8 in this embodiment, the present invention is not limited to this embodiment and a different value may be used for each of these values.

As shown in FIG. 7, the gain G1 to calculate the control amount for the inverted state assumes the upper limit value (K_max) when no abnormality occurs in the inverted state. Then, when it is determined that the detected degree of abnormality exceeds the S2 level, the value is reduced to the lower limit value (K_min) at a constant rate. Meanwhile, the gain G2 to calculate the control amount for the speed control is set to the lower limit value (K_min) as shown in FIG. 8 when no abnormality occurs in the inverted state. This lower limit value preferably has a value sufficiently small with respect to the upper limit value (K_max). Then, when abnormality occurs in the inverted state and the degree of abnormality reaches S3, the value of the gain G2 is gradually increased to the upper limit value (K_max).

Next, when the abnormality in the inverted state is restored and the degree of abnormality decreases below S2, the value of the gain G1 is gradually increased and restored to the upper limit value (K_max) while the gain G2 is reduced toward the lower limit value (K_min). In this manner, the gains G1 and G2 change so as to have hysteresis characteristics according to the degree of abnormality in the inverted state.

Note that the above-described example is merely an example in which the values of gains are changed according to the degree of abnormality, and the present invention is not limited to that example. For example, if necessary, the degree of abnormality in the inverted state that is used to change the values of the gains can be changed as appropriate in its level.

Furthermore, as for the technique to determine the degree of abnormality in the inverted state as described above, the degree indicating abnormality in the inverted state may be determined in a more precise manner by using a signal obtained from an acceleration sensor, a sensor to discriminate the shape of the floor surface, and a similar sensor, and combining the signals from these sensors with the above-mentioned obtained signal indicating the abnormality in the inverted state.

Note that the technique to determine the degree of abnormality in the inverted state of an inverted type moving body like this is not limited to the above-described techniques. Another embodiment that determines the degree of abnormality in the inverted state is explained hereinafter with reference to FIGS. 9 to 11. Since the moving body in accordance with this embodiment of the present invention has also substantially the same structures as those of the moving body explained in the above-described first embodiment, explanation of each structure of the moving body is omitted.

Third Embodiment of the Invention

Specifically, in an inverted type moving body in accordance with this embodiment of the present invention, abnormality in the inverted state of the moving body is detected by establishing a phase plane where the horizontal axis represents the deviation "x" between the actual measurement value and the estimated value of the inclination angle of the main body 10 and the vertical axis represents the deviation "y"

between the actual measurement value and the estimated value of the rotation angular speed of the rotational bodies (driving wheels) and arranging the deviation values (x, y) that are obtained while the moving body 1 is moving in the phase plane as coordinates.

Figure 9:
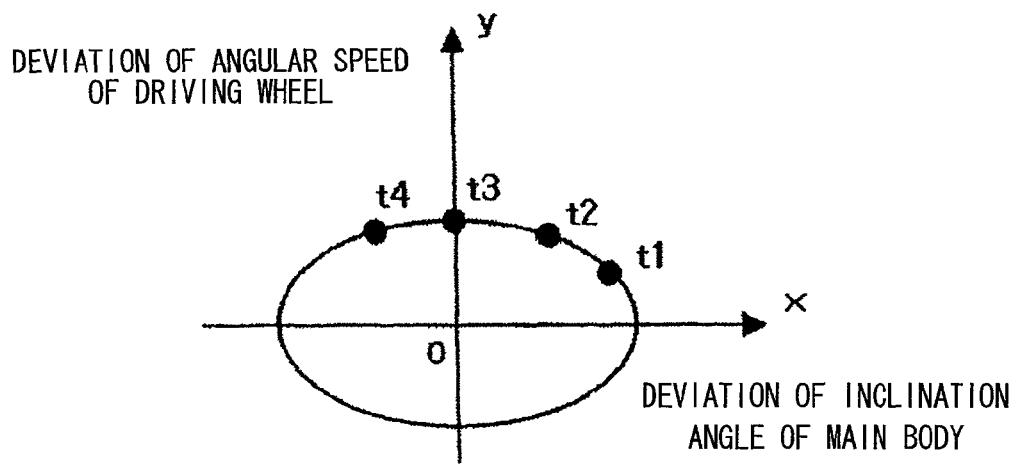
FIG. 9 is a graph illustrating a phase plane where coordinates specified by the deviation values of the inclination angle of the main body and the angular speed of the driving wheels change according to the movement of a moving body in accordance with a third embodiment of the present invention when the floor surface on which the moving body moves is an ideal flat surface.

FIG. 9 shows a situation where coordinates specified by the deviation values change according to the movement of a moving body in the case where the floor surface on which the moving body moves is an ideal flat surface. As shown in FIG. 9, in the case where the deviation "x" of the inclination angle of the main body is expressed as the x-coordinate and the deviation "y" of the rotation angular speed of the driving wheels is expressed as the y-coordinate, if the floor surface on which the moving body moves is an ideal flat surface, the track drawn by its coordinates becomes substantially an ellipse. The signs t1-t4 in FIG. 6 represent coordinates that are continuously obtained as the moving body moves, and it can be seen that these coordinates are located substantially on the above-described elliptic track.

Figure 10:
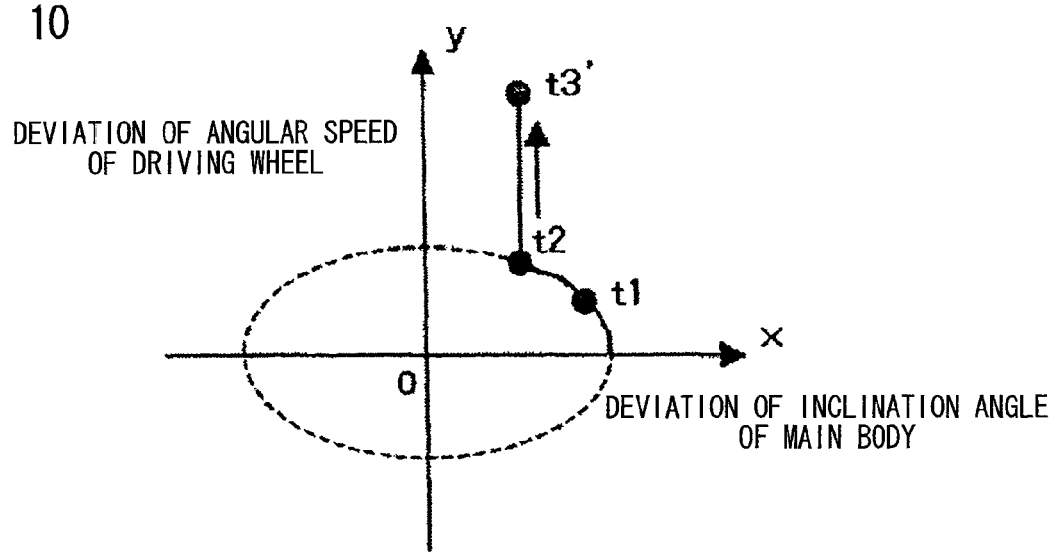
FIG. 10 is a graph illustrating an example where the coordinates specified by the deviation values change according to the movement of the moving body in the phase plane when the driving wheels spin freely while the moving body is moving.

Next, FIG. 10 shows an example in which the coordinates specified by the deviation values changes in the case where the driving wheels come off the floor surface and spin freely while the moving body is moving. The coordinates $t_3'$ shown in FIG. 10 represent coordinates specified by the deviation of the inclination angle of the main body and the deviation of the angular speed of the driving wheels at the time when the driving wheels starts the free-spinning. As shown in FIG. 10, when a transition is made from the time when the coordinates $t_2$ is obtained to the time when the coordinates $t_3'$ is obtained, the angular speed of the driving wheels becomes abruptly larger due to the free-spinning of the wheels, and therefore the coordinates $t_3'$ widely deviates from the above-described elliptic track. That is, when the driving wheels spin freely and the inverted state become abnormal, the track obtained on the phase plane is widely displaced from the ellipse like the one described above.

Figure 11:
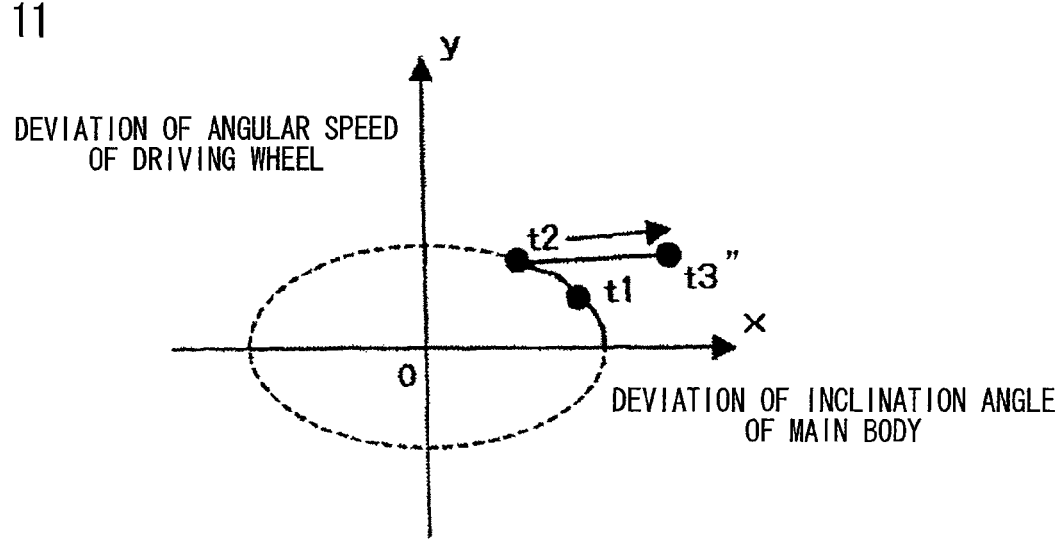
FIG. 11 is a graph illustrating an example where the coordinates specified by the deviation values change according to the movement of the moving body in the phase plane when large external force is applied to the moving body while the moving body is moving.

Furthermore, FIG. 11 shows an example in which the coordinates specified by the deviation values changes in the case where large external force is applied to the moving body while the moving body is moving. The coordinates $t_3''$ shown in FIG. 11 represent coordinates specified by the deviation of the inclination angle of the main body and the deviation of the angular speed of the driving wheels at the time when external force is applied to the moving body. As shown in FIG. 11, when a transition is made from the time when the coordinates $t_2$ is obtained to the time when the coordinates $t_3''$ is obtained, the main body is inclined at an angle widely deviating from the estimated inclination angle due to the external force applied to the main body, and therefore the coordinates $t_3''$ widely deviates from the above-described elliptic track.

As explained above, when the deviation of the inclination angle of the main body and the deviation of the angular speed of the driving wheels are expressed as coordinates on the phase plane, the relation between these deviations draws substantially an elliptic track. Therefore, whether obtained coordinates are contained in a specific area that is obtained from this track with certain errors taken into account or not, i.e., when the track that is obtained by obtaining the coordinates is not contained in the specific area, abnormality must be occurring in the inverted state of the moving body. In addition, the degree of the abnormality can be also detected by determining how far the track is separated from the specific area.

Figure 12:
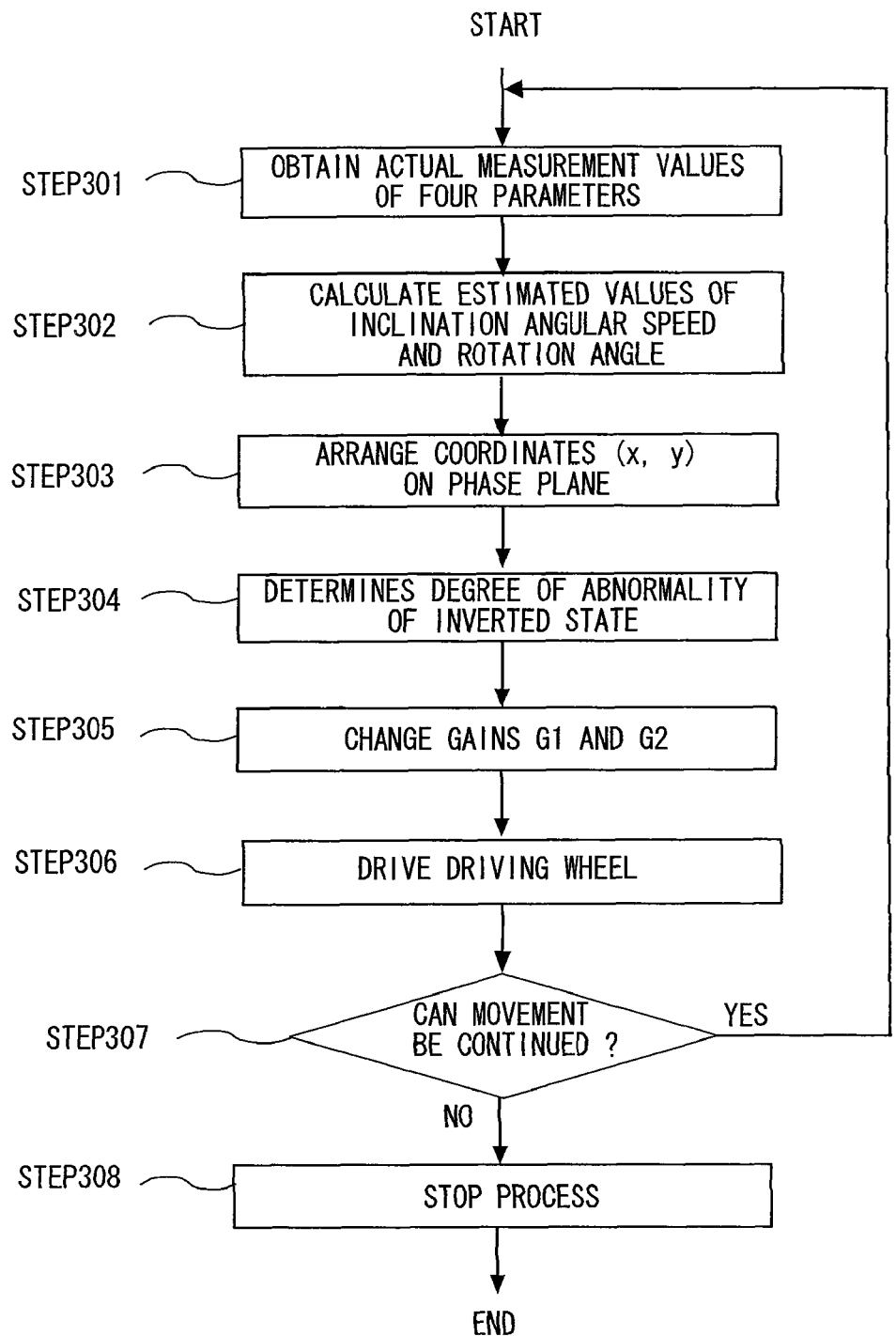
FIG. 12 is a flowchart for illustrating a procedure to carry out the inversion control according to the degree of abnormality in the inverted state in an inverted type moving body in accordance with the first embodiment of the present invention.

Next, a procedure by which the moving body 1 in accordance with this embodiment of the present invention carries out the inversion control depending on the degree of abnormality in its inverted state is explained with reference to a flowchart shown in FIG. 12.

Firstly, when the moving body 1 that moves on the floor surface P starts its movement, the moving body 1 simultaneously obtains the actual measurement values of four parameters during the movement, i.e., the inclination angle and the inclination angular speed with respect to the vertical direction of the main body 10, and the rotation angle and the rotation angular speed of the rotational bodies (driving wheels) (STEP 301).

Next, after obtaining these parameters, the main body 10 calculates an estimated value of the inclination angle of the main body 10 and an estimated value of the rotation angular speed of the driving wheels by using the corresponding remaining three parameters (STEP 302).

Then, by using a phase plane where the horizontal axis represents the deviation "x" between the actual measurement value and the estimated value of the inclination angle of the main body 10 and the vertical axis represents the deviation "y" between the actual measurement value and the estimated value of the rotation angular speed of the rotational bodies (driving wheels), the deviation values (x, y) that are obtained while the moving body 1 is moving are arranged in the phase plane as coordinates (STEP 303).

Then, the degree of abnormality in the inverted state is determined based on the positional relation between the predetermined track (track that is drawn when no abnormality occurs in the inverted state) and the arranged coordinates on the phase plane, e.g., the distance between the deviation values (x, y) that are obtained while the moving body is moving and the track (STEP 304). Then, the gains G1 and G2 are established based on the determined degree of abnormality, and the rotational driving amount of the driving wheels is determined by using both of the established gains (STEP 305). Then, the driving wheels are driven according to the determined rotational driving amount and the movement is continued (STEP 306). Then, the decision whether the traveling is stopped or not is made (STEP 307), and if the traveling of the moving body is to be continued, the processes from the above-described Steps 301 to 306 are continuously repeated. Furthermore, if it is determined that the traveling is not to be continued at the Step 307, a predefined stop process is carried out (STEP 308) and it waits for the next command.

Note that although the deviation values (x, y) that are obtained while the moving body is moving are plotted as coordinates in the phase plane where the horizontal axis represents the deviation "x" between the actual measurement value and the estimated value of the inclination angle of the main body and the vertical axis represents the deviation "y" between the actual measurement value and the estimated value of the rotation angular speed of the rotational bodies (driving wheels), and the abnormality in the inverted state is determined based on the distance between a predefined track and the plotted coordinates in this embodiment, the present invention is not limited to this embodiment. For example, coordinates may be obtained in a time-series manner, so that the degree of abnormality in the inverted state may be determined, when the x-coordinate value or the y-coordinate value changes significantly between consecutive coordinates, based on the amount of that change. As for the technique like this, a technique in which when abnormality occurs in the inverted state, the gradients of the track between consecutive coordinates are successively calculated, the changes in the gradient is obtained, and the degree of abnormality in the inverted state is determined based on the obtained changes in the gradient may be used.

As has been explained above, an inverted type moving body and a method of controlling the inverted type moving body in accordance with the present invention can carry out the inversion control with stability without using a special sensor or the like even when convex portions such as steps and fixed obstacles exist on the floor surface on which the inverted type moving body moves.

Note that although an embodiment in which a passenger rides on the boarding platform and the movement is controlled by the passenger by manipulating the manipulation portion (not shown) is explained in the above-mentioned three embodiments, the moving body may carry an object on the boarding platform and move autonomously. That is, a moving body in accordance with the present invention is also applicable to, for example, a carrier to transport an object in a factory or home. In this case, the moving body may not be the one described above in which the movement is controlled by the manipulation of a passenger, but may be the one in which its movement is autonomously controlled by a signal from a sensor (infrared sensor or the like) provided in the moving body to recognize the surrounding environment. Furthermore, the present invention is also suitably applicable to a moving body like the one that moves in accordance with a predetermined movement path.

Note that although an embodiment in which a passenger rides on the boarding platform and the movement is controlled by the passenger by manipulating the manipulation portion (not shown) is explained in the above-mentioned three embodiments, the moving body may carry an object on the boarding platform and move autonomously. That is, a moving body in accordance with the present invention is also applicable to, for example, a carrier to transport an object in a factory or home. In this case, the moving body may not be the one described above in which the movement is controlled by the manipulation of a passenger, but may be the one in which its movement is autonomously controlled by a signal from a sensor (infrared sensor or the like) provided in the moving body to recognize the surrounding environment. Furthermore, the present invention is also suitably applicable to a moving body like the one that moves in accordance with a predetermined movement path.

INDUSTRIAL APPLICABILITY

The present invention is applicable to the so-called inverted type moving body, which moves by traveling while maintaining an inverted state by controlling the rotational driving of a rotational body having a circular cross section, and a method of controlling the inverted type moving body.

The invention claimed is:

1. An inverted type moving body comprising:
a rotational body having a circular cross section;
a driving portion that rotationally drives the rotational body;
a main body that supports the rotational body;
a control portion that maintains the inverted state of the main body by controlling the driving portion such that the rotational driving of the rotational body touching a floor surface is controlled;
a first sensor that detects a rotation angle speed of the rotational body; and
a second sensor that detects at least one of an external force exerted on the main body and an inclined state of the main body,
wherein the control portion multiplies a signal obtained based on the inclined state of the main body by a predefined gain to calculate a driving amount of the rotational body for maintaining the inverted state, determines whether an inversion state of the main body is normal or not based on at least one of an output value of the first sensor and an output value of the second sensor, and reduces the gain when the inverted state of the main body is determined to be abnormal.

2. The inverted type moving body according to claim 1, wherein the degree of reduction in the gain is changed according to the degree of abnormality in the inversion state of the main body.

3. The inverted type moving body according to claim 2, wherein an upper limit value and a lower limit value for the gain according to the degree of abnormality in the inverted state of the main body are defined, and the gain is changed between the upper limit value and the lower limit value.

4. The inverted type moving body according to claim 1, wherein the main body comprises a boarding platform that carries a passenger thereon.

5. The inverted type moving body according to claim 1, wherein the rotational body is a pair of wheels arranged in parallel on both sides with respect to the moving direction of the main body, and the rotation of the wheels can be independently controlled.

6. The inverted type moving body according to claim 1, further comprising a speed detection portion that detects the speed of the main body,
wherein the control portion calculates a driving amount of the rotational body for maintaining the inverted state based on a value obtained by multiplying a signal obtained based on the inclined state of the main body by a predefined gain, and a value obtained by multiplying a signal obtained by the speed detection portion based on the speed of the main body by a predefined gain.

7. The inverted type moving body according to claim 6, wherein when the inverted state of the main body is determined to be abnormal, the gain to be multiplied to the signal obtained based on the speed of the main body is increased.

8. The inverted type moving body according to claim 6, further comprising a speed estimation portion that estimates the speed of the main body,
wherein when the inverted state of the main body is determined to be abnormal, the control portion establishes a target speed based on a speed estimated by the speed estimation portion and increases the gain to be multiplied to the signal obtained based on the speed of the main body such that the target speed is achieved.

9. The inverted type moving body according to claim 1, further comprising:
a measurement portion that simultaneously obtains actual measurement values of four parameters including an inclination angle and an inclination angular speed with respect to the vertical direction of the main body, and a rotation angle and a rotation angular speed of the rotational body; and
an estimation portion that estimates, based on the actual measurement values of three parameters selected from the actual measurement values of the four parameters obtained by the measurement portion and a control amount of the rotational body, a value of the non-selected one other parameter;
wherein abnormality in the inverted state of the main body is detected based on deviation between the estimated value and the actual measurement value of the non-selected parameter.

10. The inverted type moving body according to claim 9, wherein abnormality in the inverted state of the main body is detected based on the magnitude of deviation between the actual measurement value and the estimated value.

11. The inverted type moving body according to claim 9, wherein each of an actual measurement value and an estimated value of the inclination angle with respect to the vertical direction of the main body and an actual measurement value and an estimated value of the rotation angular speed of the rotational body are obtained, and abnormality in the inverted state of the main body is detected based on deviations between these estimated values and actual measurement values.

12. The inverted type moving body according to claim 9, wherein at least two combinations of three parameters is selected from the actual measurement values of the four parameters, and abnormality in the inverted state of the main body is detected based on deviation between the estimated value and the actual measurement value of the other one parameter obtained for each of the combinations.

13. The inverted type moving body according to claim 12, wherein deviations between actual measurement values and estimated values of the inclination angle with respect to the vertical direction of the main body and deviations between actual measurement values and estimated values of the rotation angular speed of the rotational body are obtained continuously and simultaneously, and abnormality of the inverted state of the main body is detected based on a track obtained by arranging these deviations as coordinates on a phase plane where one axis represents deviation between the actual measurement value and the estimated value of the inclination angle and the other axis represents deviation between the actual measurement value and the estimated value of the rotation angular speed of the rotational body.

14. The inverted type moving body according to claim 13, wherein a predefined area is established in the phase plane, and the degree of abnormality in the inverted state of the main body is determined based on a distance by which the obtained track is separated from the area.

15. The inverted type moving body according to claim 13, wherein the degree of abnormality in the inverted state of the main body is determined based on the gradient of the track in the phase plane.

16. A method of controlling an inverted state of an inverted type moving body, the inverted type moving body comprising:
a rotational body having a circular cross section;
a driving portion that rotationally drives the rotational body;
a main body that supports the rotational body;
a control portion that maintains the inverted state of the main body by controlling the driving portion such that the rotational driving of the rotational body touching a floor surface is controlled;
a first sensor that detects a rotation angle speed of the rotational body; and
a second sensor that detects at least one of an external force exerted on the main body and an inclined state of the main body, the method of controlling the inverted type moving body comprising:
obtaining, by the control portion, a signal indicating the inclined state of the main body; and
calculating, by the control portion, a driving amount of the rotational body for maintaining the inverted state by multiplying the signal obtained based on the inclined state of the main body by a predefined gain; and
determining, by the control portion, whether the inverted state of the main body is abnormal or not based on at least one of an output value of the first sensor and an output value of the second sensor; and
reducing, by the control portion, the gain when the inverted state of the main body is determined to be abnormal.

17. The method of controlling an inverted type moving body according to claim 16, wherein the degree of reduction in the gain is changed according to the degree of abnormality in the inversion state of the main body in the gain reduction.

18. The method of controlling an inverted type moving body according to claim 17, wherein an upper limit value and a lower limit value for the gain according to the degree of abnormality in the inverted state of the main body is defined, and the gain is changed between the upper limit value and the lower limit value in the gain reduction.

19. The method of controlling an inverted type moving body according to claim 16, further comprising detecting the speed of the main body,
wherein a driving amount of the rotational body for maintaining the inverted state is calculated based on a value obtained by multiplying a signal obtained based on the inclined state of the main body in the inclined state acquisition step by a predefined gain, and a value obtained by multiplying a signal obtained based on the speed of the main body in the speed detection step by a predefined gain in the driving amount calculation.

20. The method of controlling an inverted type moving body according to claim 19, further comprising increasing the gain to be multiplied to the signal obtained based on the speed of the main body when the inverted state of the main body is determined to be abnormal in the inverted state decision.

21. The method of controlling an inverted type moving body according to claim 19, further comprising the speed of the main body,
wherein when the inverted state of the main body is determined to be abnormal in the inverted state decision step, a driving amount of the rotational body is calculated such that a target speed established based on the speed estimated in the speed estimation step is achieved in the driving amount calculation.

\* \* \* \* \*